(No Model.) 2 Sheets—Sheet 1.
F. G. MYERS.
MACHINE FOR EDGING DRILL BITS, &c.
No. 579,363. Patented Mar. 23, 1897.
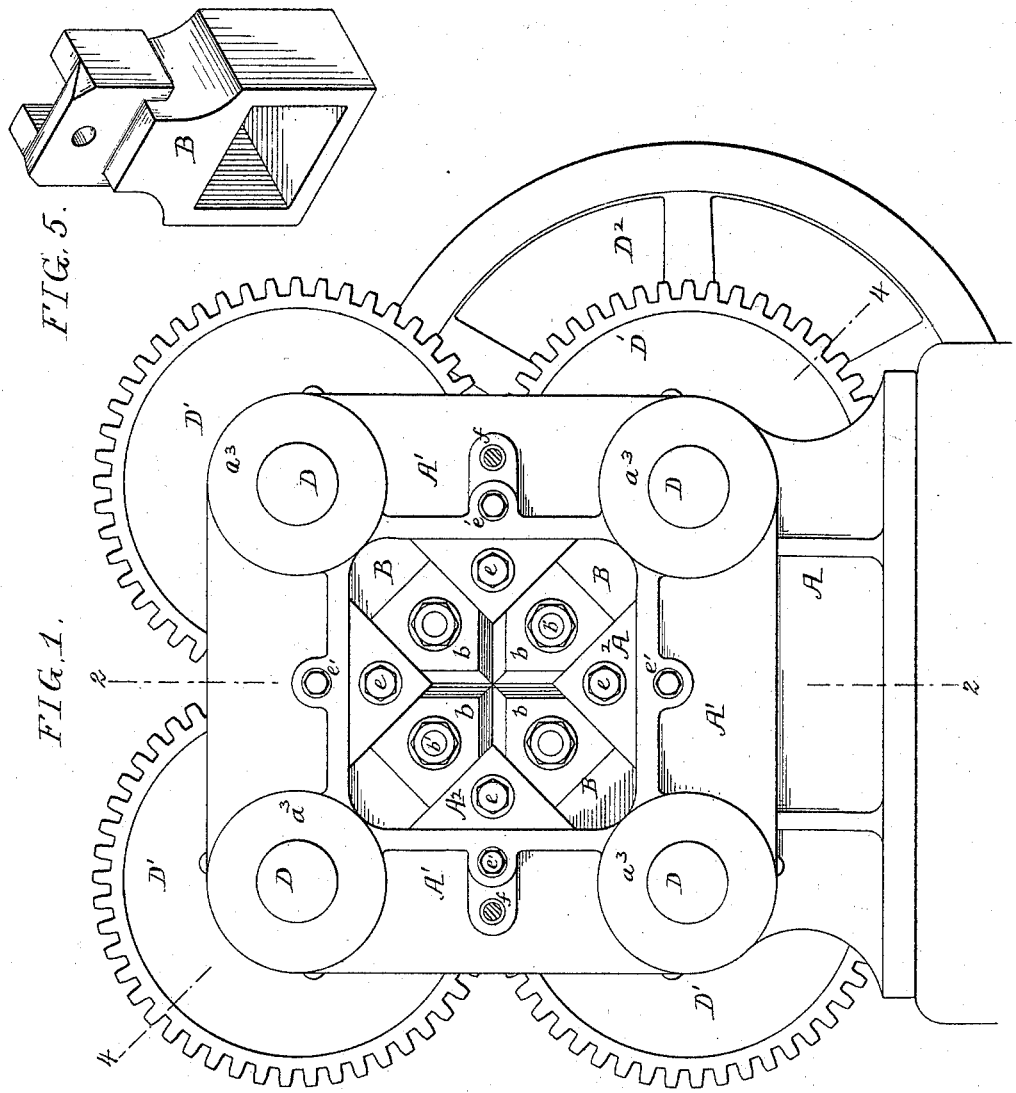
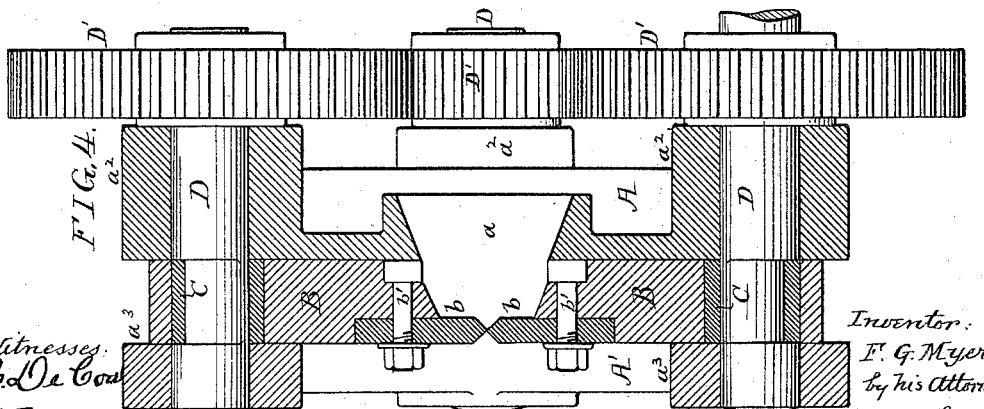
Witnesses:
C. D. e Cou
H. S. Turner
Inventor:
F. G. Myers
by his Attorneys
Howson & Howson (No Model.) 2 Sheets—Sheet 2.
F. G. MYERS.
MACHINE FOR EDGING DRILL BITS, &c.
No. 579,363. Patented Mar. 23, 1897.
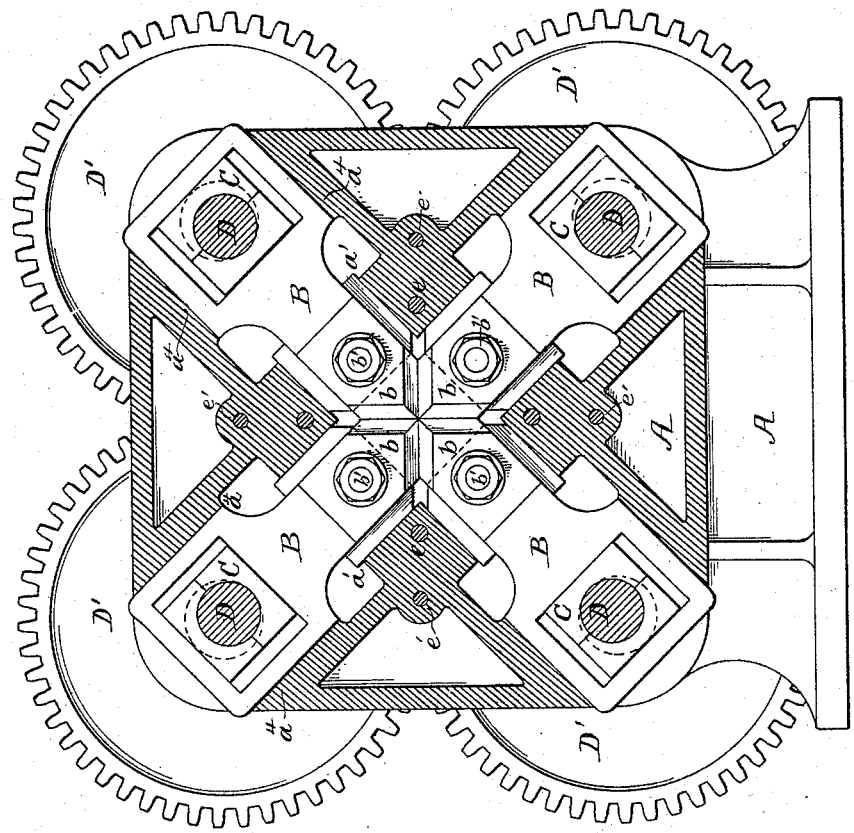
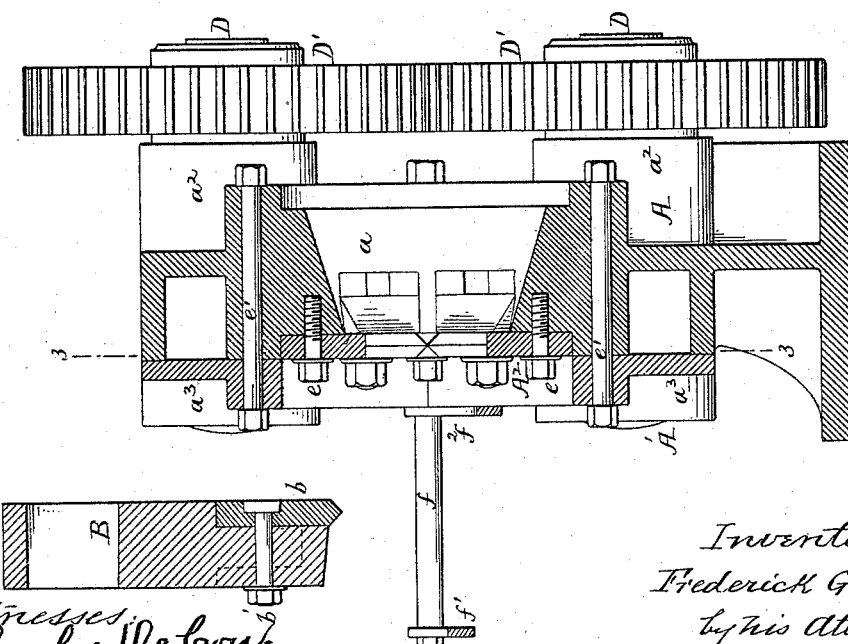
Witnesses
Charles DeCou
Hamilton D. Turner
Inventor:
Frederick G. Myers
by his Attorneys
Howson & Howson

UNITED STATES PATENT OFFICE.

FREDERICK GEORGE MYERS, OF PHILADELPHIA, PENNSYLVANIA.

MACHINE FOR EDGING DRILL-BITS, &c.

SPECIFICATION forming part of Letters Patent No. 579,363, dated March 23, 1897.

Application filed December 24, 1896. Serial No. 616,882. (No model.) Patented in South African Republic September 12, 1895, No. 964.

*To all whom it may concern:*

Be it known that I, FREDERICK GEORGE MYERS, a citizen of the United States, residing in Philadelphia, Pennsylvania, have invented certain Improvements in Machines for Edging Drill-Bits, &c., (for which I have obtained Letters Patent in South African Republic, No. 964, dated September 12, 1895,) of which the following is a specification.

My invention relates to certain improvements in machines for edging rock-drill bits and other tools by means of cutting.

The object of my invention is to so construct the machine that two or more cutters or dies will converge toward a common center, the mechanism for operating these cutters or dies being so timed that they will come together at the center and sever the bit or other tool placed in the machine. This object I attain in the following manner, reference being had to the accompanying drawings, in which—

Figure 1 is a face view of my improved machine for edging drill-bits, &c., with the supports for the shank of the bit removed. Fig. 2 is a transverse section on the line 2 2, Fig. 1. Fig. 3 is a sectional view on the line 3 3, Fig. 2. Fig. 4 is a section on the line 4 4, Fig. 1. Fig. 5 is a perspective view of one of the slides adapted to carry a cutter, and Fig. 6 is a view showing the cutters combined with forming-dies.

A is the frame of the machine, having a central opening $a$ for the passage of the bit or other tool to be sharpened.

B are four slides. In the present instance these slides are adapted to ways $a'$ in the frame A and converge toward a common center. On one end of these slides are secured the cutting-blades $b$ by means of bolts and nuts $b'$. These cutting-blades have their ends shaped, as shown in Figs. 1 and 4, to correspond with the cut to be made. In the present instance the ends are V-shaped, so as to make a V-shaped cut.

The opposite end of each slide B is in the form of a frame in which are mounted the sliding bearings C, in which the eccentric-shafts D work. The said shafts are mounted in bearings $a^2$ in the frame A and in bearings $a^3$ in the cover-plate A' and are geared together by the spur-wheels D'. One of these shafts is a driving-shaft on which is a gear-wheel or belt-pulley by which the machine is driven, and another one of these shafts may be provided with a fly-wheel $D^2$, as shown in Fig. 1.

The slides B, as will be noticed in Fig. 3, are adapted to ways $a^4$ as well as to the ways $a'$, so as to make them perfectly rigid, and the cutters are so set in respect to each other that their points will be at the center when the cutting-edges of the slides come together.

The cover-plate A' is secured to the frame by bolts $e'$ and is open at the center, so that access may be had to the nuts securing the knives to the slides, and triangular plates $A^2$ are secured to the frame A between each cutter by bolts $e$. These plates overlap the extended edges of each slide, so as to confine the slides to the slideways as near the cutting-point as possible. Thus by the construction shown I am enabled to hold the slides rigidly in their slideways except as to the longitudinal movement. The slides are projected and withdrawn by the crank-shafts D.

Projecting from the face of the machine are bars $f$, carrying a support $f'$ for the stock of the drill-bit, which is also held in position by the supports $f^2$ near the cutters.

By the above-described machine I can cut a V-shaped edge on a star-shaped bit-blank by cutting off a small portion of the end when the blank is heated, or I may reëdge an old bit by simply heating it, then, when necessary, re-forming it in another machine or by hand, and finally cutting a piece off the end, whereby it is resharpened or edged.

In some instances it might be found advantageous to form the end of the bit and sharpen it in one operation. This can be readily accomplished in this machine by simply making the slides in the manner shown in Fig. 6, which illustrates the cutters at the rear of the slides instead of at the front, the end of the slide in this instance being so shaped as to make it a forming-die. In some instances I may make the forming-die detachable by simply forming it with the cutter or making it a separate detachable piece, and when it is required to only reform a drill or other tool the cutters can be dispensed with and the forming-dies used alone.

It will be understood that the machine shown in the drawings is especially adapted to cut or edge what are known as "star-bits," and if it is wished to cut an ordinary chisel-bit then the cutters *b* are removed from the slides and suitable cutters substituted for the two opposing cutters, and it will be understood that the machine can be constructed with any number of slides which converge toward a common center, depending altogether upon the shape of the article to be cut.

I claim as my invention—

1. The combination in a machine for edging star-bits, the same consisting of a frame having slideways therein, four reciprocating slides, means for moving the slides toward and from a common center, and cutting-blades secured to each slide, each blade being V-shaped so that all the wings of the star-bit inserted in the machine will be simultaneously cut by the dies as the slides come together, substantially as described.

2. The combination of the frame, slideways therein, crank-shafts mounted in the frame, slides adapted to the slideways, said slides having one end in the form of a frame, sliding bearings adapted to said frame and adapted to the crank-shafts with cutting-blades on the inner end of each slide, the said crank-shafts being geared so that the slides will move toward a common center in unison, substantially as described.

3. The combination of the frame having four slideways therein, a series of slides adapted to the slideways, each slide having at one end an open frame and at the other end a cutting-blade, boxes adapted to the frame of each slide, a series of crank-shafts mounted in the frame and having their cranks adapted to the boxes, a quadrangular cover-plate having bearings for the shafts and acting to hold the outer ends of the slides in place, substantially as described.

4. The combination of the frame having four slideways therein, a series of slides adapted to the slideways, each slide having at one end an open frame and at the other end a cutting-blade, boxes adapted to the frame of each slide, a series of crank-shafts mounted in the frame and having their cranks adapted to the boxes, a quadrangular cover-plate having bearings for the shafts and acting to hold the outer ends of the slides in place, and triangular plates secured to the frame within the cover-plate and extending over the sides of the slides near the inner ends thereof, substantially as described.

5. The combination of the frame, four crank-shafts mounted therein, said frame having an open center, slideways in the frame radiating from the center to the crank-shafts, slides in the slideways, cutters or dies on the inner end of each slide, the slides being driven by the crank-shafts, a gear-wheel on each crank-shaft, the said wheels being geared together, one of said shafts acting as the driving-shaft so that there is a central opening for the passage of a blank to be cut, substantially as described.

In testimony whereof I have signed my name to this specification in the presence of two subscribing witnesses.

FREDERICK GEORGE MYERS.

Witnesses:
 WILL. A. BARR,
 JOS. H. KLEIN.